(12) United States Patent
Roeth et al.

(10) Patent No.: US 7,136,223 B2
(45) Date of Patent: Nov. 14, 2006

(54) EROGONOMICALLY ARRANGED OBJECT ADJUSTMENT CONTROLS

(75) Inventors: Jasna Roeth, Solms (DE); Manfred Gilbert, Schoeffengrund (DE); Russell Bonaventura, Williamsville, NY (US)

(73) Assignee: Leica Microsystems CMS GmbH, Wetzlar (DE)

( * ) Notice: Subject to any disclaimer, the term of this patent is extended or adjusted under 35 U.S.C. 154(b) by 114 days.

(21) Appl. No.: 10/811,344

(22) Filed: Mar. 26, 2004

(65) Prior Publication Data
US 2005/0111096 A1    May 26, 2005

Related U.S. Application Data

(63) Continuation-in-part of application No. 10/721,695, filed on Nov. 25, 2003, and a continuation-in-part of application No. 10/733,628, filed on Dec. 11, 2003.

(51) Int. Cl.
*G02B 21/26* (2006.01)
(52) U.S. Cl. .................. 359/393; 359/391; 359/392
(58) Field of Classification Search ............... 359/379, 359/380, 391–393
See application file for complete search history.

(56) References Cited

U.S. PATENT DOCUMENTS 4,911,543 A * 3/1990 Hodgson ................. 359/369
5,861,985 A   1/1999 Ikoh ....................... 359/388
5,906,148 A * 5/1999 Aihara et al. .............. 83/72
6,313,945 B1 * 11/2001 Takeuchi ................. 359/393

OTHER PUBLICATIONS

Leica CM E Compound Microscope System "The Vision to Create Microscopy Solutions for Education" Copyright 2000 Leica Microsystems Inc. ISO-9001 EDU-2110 Rev. a Oct. 2000.

* cited by examiner

*Primary Examiner*—Drew A. Dunn
*Assistant Examiner*—Joshua L. Pritchett
(74) *Attorney, Agent, or Firm*—Simpson & Simpson, PLLC

(57) ABSTRACT

A microscope having a moveable object holder forming a part of a stage assembly. The stage assembly includes at least one x-y control, for moving the stage assembly or a portion thereof, e.g. the object holder, in a horizontal x direction, which x direction is parallel to the shoulders of an operating microscopist sitting square to the microscope, and for moving the stage assembly or portion thereof in a horizontal y direction perpendicular to the x direction. The microscope has dual controls for moving the stage assembly or a portion thereof in a z direction perpendicular to the x-y directions and parallel to an optical path into an objective lens of the microscope, wherein the x-y control and z controls are located so as to permit single hand operation of both controls with minimal hand movement or so as to permit comfortable ergonomic dual hand operation while permitting the shoulders of an operating microscopist to remain aligned parallel to the x direction.

15 Claims, 9 Drawing Sheets

EROGONOMICALLY ARRANGED OBJECT ADJUSTMENT CONTROLS

CROSS REFERENCE TO RELATED APPLICATIONS

This application for patent is a Continuation-in-Part of U.S. patent application Ser. No. 10/721,695, filed Nov. 25, 2003 and Ser. No. 10/733,628 filed Dec. 11, 2003.

FIELD OF THE INVENTION

The present invention relates generally to microscopy, more specifically to a mechanism for controlling stage movement of a microscope.

BACKGROUND OF THE INVENTION

As is well known, a microscope is an optical instrument used to view, examine and study very small objects. There are many different types of microscopes, each best suited to particular applications. These include compound microscopes, stereomicroscopes, confocal microscopes, inverted microscopes, and laser microscopes, to name but a few.

The present invention relates generally to compound microscopes and to those microscopes that are equipped with a sample stage capable of being controlled by a stage drive mechanism.

Microscopes have long used stages for the positioning of samples within the optical path. Such stages usually have a flat planar surface upon which an object or object holder rests. Such objects are specimens or samples for microscopic examination. An object, i.e. a specimen or sample, can be manipulated by moving the stage, or a portion thereof, in an x, y and z axes Often, the focusing mechanism of a microscope functions by adjusting the stage height in the z axis, which is usually in line with or parallel to a light path from a light path into an objective lens of a microscope. By changing the sample height, the microscopist can focus upon the object and can focus and observe different depths within the z-axis of the sample. The focusing mechanism usually involves at least one rack and a matching pinion construction for adjusting the height of, i.e. raising and lowering, the stage. The rack is usually attached to the stage and the pinion is directly or indirectly rotatably attached to the frame so that rotation of the pinion raises and lowers the stage along the rack. At least one focusing knob is in turn secured to the pinion so that rotation of the focusing knob in turn rotates the pinion. In better microscopes, focusing knobs are attached on both the left and right of the microscope to permit easy left and right hand operation of a focusing knob.

The x and y axes are generally perpendicular to the z axis and to each other. Conventionally, the x axis is considered to be left and right relative to an operating microscopist during normal operation and the y axis is considered to be forward and backward relative to the operating microscopist during normal operation. The z axis is usually up and down relative to the earth during normal; operation. It is to be understood that the directions described above are relative directions to each other and when the microscope is not in operation may not maintain the above described relationship to a microscopist or the earth.

In order to adjust the x or the y position of the object, the user must have available a control mechanism capable of performing this movement. Typically such mechanisms are simple manual slides or involve pinion and rack or cable and pulley mechanisms or combinations thereof.

Due to the variety of microscopists using these instruments, both left & right-handed stages are desirable. The location of the stage control mechanism is preferably on the side of the stage matching the user's predominant hand of use. Further complicating the problem, a laboratory may have a left-handed and a right-handed user sharing a single microscope.

A further very significant problem with existing microscopes is that control mechanisms, for adjusting x-y position of an object, by moving the stage or portions thereof, i.e. x-y control, have been placed inconveniently causing difficult operation. Such known x-y control mechanisms have, for example, been placed at the rear of the stage or behind a focusing knob and have thus not been conveniently placed for single hand operation of both the x-y control and focusing knob with minimal, e.g. less than a five centimeter, hand movement. Further, such known x-y controls have not even been conveniently placed for dual hand operation of both the x-y control and focusing knob without requiring inconvenient postural positions by the microscopist. Such x-y controls have thus been ergonomically unsatisfactory.

BRIEF SUMMARY OF THE INVENTION

The present invention broadly comprises a microscope having a microscope stage assembly including at least one x-y control, for moving the stage assembly or a portion thereof in a horizontal x direction, which x direction can be placed so that it is parallel to the shoulders of an operating microscopist sitting square to the microscope, and for moving the stage assembly or portion thereof in a horizontal y direction perpendicular to the x direction and dual controls for moving the stage assembly or a portion thereof in a z direction perpendicular to the x-y directions and parallel to an optical path into an objective lens of the microscope, wherein the x-y control and z controls are located so as to permit single hand operation of both controls with minimal hand movement or so as to permit comfortable ergonomic dual hand operation while permitting the shoulders of an operating microscopist to remain aligned parallel to the x direction.

The invention therefore has the object of providing a microscope that can be operated to move its stage assembly or portions thereof in x, y and z directions while permitting efficient and comfortable ergonomic operation.

This and other objects, features and advantages of the present invention will become readily apparent to those having ordinary skill in the art upon reading the detailed description of the invention in view of the drawings and appended claims.

More specifically, the invention is preferably a microscope having an optical path into and through the center of an objective lens and having a microscope stage assembly which in turn has a stage planar surface. The stage assembly includes mounting structure for attachment to a frame of the microscope so that the planar surface is essentially perpendicular to the optical path. An object holder is provided for holding an object for examination by the microscope, and structure is provided for moving the object holder relative to the optical path so that a held specimen moves through the optical path parallel to the planar surface. The structure for moving the object holder includes at least a first control knob mounted so as to intersect a rotational axis of a rotatable focusing knob of the microscope, when the optical path passes through a center of an object holding area of the object holder.

BRIEF DESCRIPTION OF THE DRAWINGS

The nature and mode of operation of the present invention will now be more fully described in the following detailed description of the invention taken with the accompanying drawing figures.

DETAILED DESCRIPTION OF THE INVENTION

Figure 1:
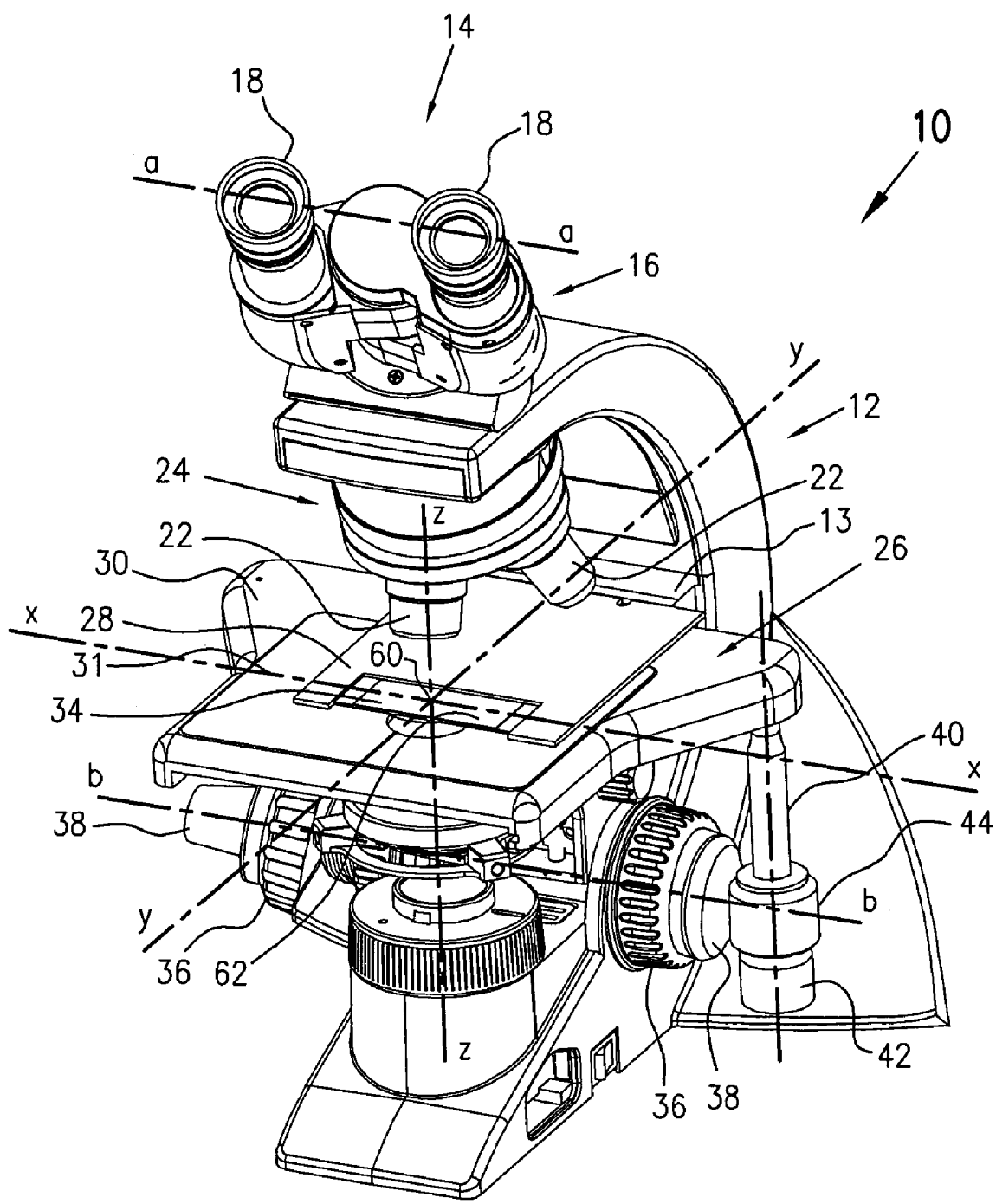
FIG. 1 is a front perspective view of a typical compound microscope of the present invention showing an x-y control knob mounted so as to intersect a rotational axis of a rotatable focusing knob of the microscope, when the optical path passes through a center of an object holding area of the object holder.

It should be appreciated at the outset that while the present invention relates to an "Ergonomically Arranged Object Adjustment Controls", the Assignees of the present Application for Patent have developed certain other improvements to microscopes described in United States Patent Applications entitled "Interchangeable Microscope Stage Drive Assembly", "Releasable/Interchangeable Fine Focus Knob for a Microscope", "Shielded-Ergonomic Microscope Stages", "Lamp Assembly for a Microscope" and "Means for Transporting a Microscope", which applications are filed concurrently herewith by the Assignees of the present Application for Patent, which Applications are incorporated herewith by reference in their entireties.

The invention is a microscope having a moveable object holder forming a part of a stage assembly. The stage assembly includes at least one x-y control, for moving the stage assembly or a portion thereof, e.g. the object holder, in a horizontal x direction, which x direction is parallel to the shoulders of an operating microscopist sitting square to the microscope, and for moving the stage assembly or portion thereof in a horizontal y direction perpendicular to the x direction.

The object holder is typically a microscope holder for a slide having a prepared specimen but may be a holder for another object, e.g. a sample having a rigid flat surface for examination such as a ceramic, polymer or polished mineral material or a rigid transparent or semi-transparent material such as a transparent or semi-transparent plastic, ceramic, gem, or glass-like substance. The object holder typically operates by gripping the edges of an object, e.g. with gripping arms or clamps.

The x-y control is any control for moving the object holder in the x-y directions. The word "control" is intended to refer to the operator manipulated mechanism, e.g. a rotatable knob or slide, as opposed to the control mechanism, i.e. the mechanical and/or electrical apparatus connected with the control to actually move the object holder, e.g. including a rack and pinion, belt (cable) and pulleys, stepping motor and worm gear, etc. The x-y control usually has two independently operable rotatable knobs, one for x direction movement of the object holder and the other for y direction movement of the object holder. Such x and y operating knobs may be assembled coaxially for ease of operation and are connected to the x and y control mechanisms for moving the object holder in the x and y directions as previously described.

The x-y control mechanism for moving the object holder can operate to move the entire stage assembly, to which the object holder is attached, may operate to move any other portion of the stage assembly to which the object holder is attached and/or may operate to move only the object holder.

The dual controls for moving the stage assembly or a portion thereof in a z direction perpendicular to the x-y directions and coincident or parallel to an optical path into an objective lens of the microscope are generally z axis adjusting knobs (focusing knobs) rotationally mounted on a rotational axis parallel to the x axis. The focusing knobs are preferably mounted coaxially on opposite (right and left) sides of the microscope to permit ease of operation from either the right or left side. Both coarse and fine focusing knobs may be provided where the fine focusing knobs are usually connected by planetary gears within the z axis adjusting knobs so as to permit multiple revolutions of the fine adjustment knobs to provide a single revolution of the adjusting (coarse adjustment) knobs. The z axis adjusting knobs (focusing knobs) are connected with and operate a z axis adjusting mechanism, usually in the form of a rack and pinion where the rack is secured to the stage assembly and the pinion is secured to and rotated by the z axis adjusting knobs in turn secured directly or in directly to the frame of the microscope.

In accordance with the invention, the x-y control and z controls are located so as to permit single hand operation of both the x-y control and one of the z controls with minimal hand movement and/or so as to permit comfortable ergonomic dual hand operation of the x-y control and one of the z controls while permitting the shoulders of an operating microscopist to remain aligned parallel to the x direction.

A preferred microscope, in accordance with the invention has at least one and preferably two ocular lenses, at least one objective lens and a microscope stage assembly which in turn has a stage planar surface.

The stage assembly includes:
a) apparatus for attachment to a frame of the microscope so that the planar surface is essentially perpendicular to an optical path through a center of the objective lens;
b) an object holder for holding an object for examination by the microscope; and
c) apparatus for moving the object holder relative to the optical path so that a held object moves through the optical path parallel to the planar surface. The apparatus for moving the object holder includes at least a first control knob mounted so as to intersect a rotational axis of a rotatable focusing knob of the microscope, when the optical path passes through a center of a specimen holding area of the object holder.

The apparatus for attachment may be a mounting bracket connected between the frame and the stage assembly where the bracket is connected to the frame with mounting screws and the stage assembly is connected to the bracket with a slide mechanism. Other structure for attaching the stage assembly to the frame can be easily envisioned by those skilled in the art, e.g. a slide mechanism can be directly mounted to the frame and the stage assembly can be secured to the slide mechanism with screws or the stage assembly can be mounted on roller bearings attached to the frame. In any case, it is usual for the stage mechanism to be mounted to the frame so that it can move in at least one of the x and y directions.

The apparatus for moving the object holder generally includes apparatus for moving the entire stage in at least one of the x or y axis, e.g., using a rack and pinion, cable and pulleys or worm gear system. Usually the entire stage assembly is moved in only one of the x and y axes while the object holder alone is moved in the remaining x or y axis. Usually, the apparatus for moving the object holder in the y direction comprises a pinion rotatably attached to and forming a part of the stage assembly that engages with a rack rigidly attached to the frame so that rotation of the pinion moves the stage assembly in the x direction along the rack relative to the frame. The z direction control knob is generally attached to a z axis pinion so that rotation of the z direction control knob rotates the pinion along a z axis rack to move the stage up and down.

Apparatus for moving the object holder in the x direction is usually apparatus for moving the object holder relative to the planar surface of the stage. Such apparatus, for example, may be a rack and pinion, with one of the rack or pinion attached to the object holder and the other of the rack or pinion attached to the object holder. In such a case, the pinion is attached to the x axis control knob so that that rotation of the x axis control knob rotates the pinion relative to the rack to move the object holder. The preferred apparatus for moving the object holder relative to the stage includes a cable loop attached to the object holder that passes around pulleys rotatably mounted to the stage wherein the cable attachment to the object holder is located between said pulleys so that rotation of a pulley causes movement of the cable and attached object holder. In such a case, the x axis control knob is attached to on of the pulleys such that rotation of the x axis control knob causes rotation of the pulley to move the cable and attached object holder in the x axis relative to the planar surface of the stage.

The x axis control knob may be proximate to and coaxial with the y axis control knob and in accordance with the invention together form the x-y control and is arranged to intersect the rotational axis of the focusing control knobs when the when the optical path into the objective lens passes through a center of a specimen holding area of the object holder.

The microscope preferably has stereo oculars and the x axis is parallel to a line through the center of the oculars and the rotational axis of the focusing knob is parallel to a line through the center of the oculars.

The invention may be further described by reference to the drawings illustrating preferred embodiments.

It should be appreciated that like drawing numbers on different drawing views identify similar structural elements of the invention. While the present invention is further described with respect to what is presently considered to be preferred embodiments, it is understood that the invention as claimed is not limited to the disclosed preferred embodiments. In the description below, the terms "up", "down", "forward", "backward", "left", "right", and their derivatives, should be interpreted from the perspective of one viewing the microscope shown in FIG. 1 from the front thereof, i.e. so that right and left oculars of the microscope are facing and equidistant from right and left eyes respectively of one viewing the microscope.

Although the invention is suitable for use with a variety of light microscopes, it is useful to review the basic microscope structure and function to appreciate the present invention.

FIG. 1 illustrates the general structure of compound microscope 10. The microscope broadly comprises mounting stand or frame 12 to which all the component pieces of the microscope are mounted. In the embodiments shown, the viewing body 14 is binocular, comprising a body 16 and two eyepieces 18 although any viewing body may be used, e.g. monocular, binocular, trinocular, video, etc. In a preferred embodiment, the eyepieces or oculars 18 are aligned on ocular centerline "a" which may act as a line of reference for orientation of movements within the microscope.

Objective lenses 22 are mounted to rotatable turret 24 permitting various objectives 22 to be indexed with the oculars 18 along a viewing light path. The center axis of the path of light entering the center of an indexed objective is indicated as line "z". Line "z" is coincident with a "z"axis of movement of stage assembly 26.

Microscope 10 further comprises microscope stage assembly 26, which is mounted to frame 12 by means of a mounting bracket 13. Microscope stage assembly 26 includes an object holder in the form of slide mount 28, stage 30, having a stage planar surface 31, and drive mechanism 32. Slide mount 28 is incorporated into and forms a part of stage assembly 26, slides along planar surface 31, and enables movement of an object held by the object holder within a specimen or object holding area of the object holder, e.g. slide holding area 34 holding a slide containing a specimen, to be viewed along an x axis "x" which is parallel to ocular centerline "a", and also parallel to a focus knob rotational axis "b". Axis "x" and axis "z" lie in perpendicular dimensions.

An x-y control 40 is provided that has coaxial knobs 42 and 44 where knob 42 controls movement of object holder 28 in the "x" direction and knob 44 controls movement of the stage in the "y" direction perpendicular to the "x" direction and passing through planar surface 31.

Coarse focus knobs 36 and fine focus knobs 38 are rotatably mounted to frame 12 along rotational axis "b". Rotation of knobs 36 and 38 move stage assembly 26 up and down in direction "z" in turn moving an object, e.g. slide 34 holding a specimen within the optical path of the microscope allowing for focus of the specimen.

Figure 2:
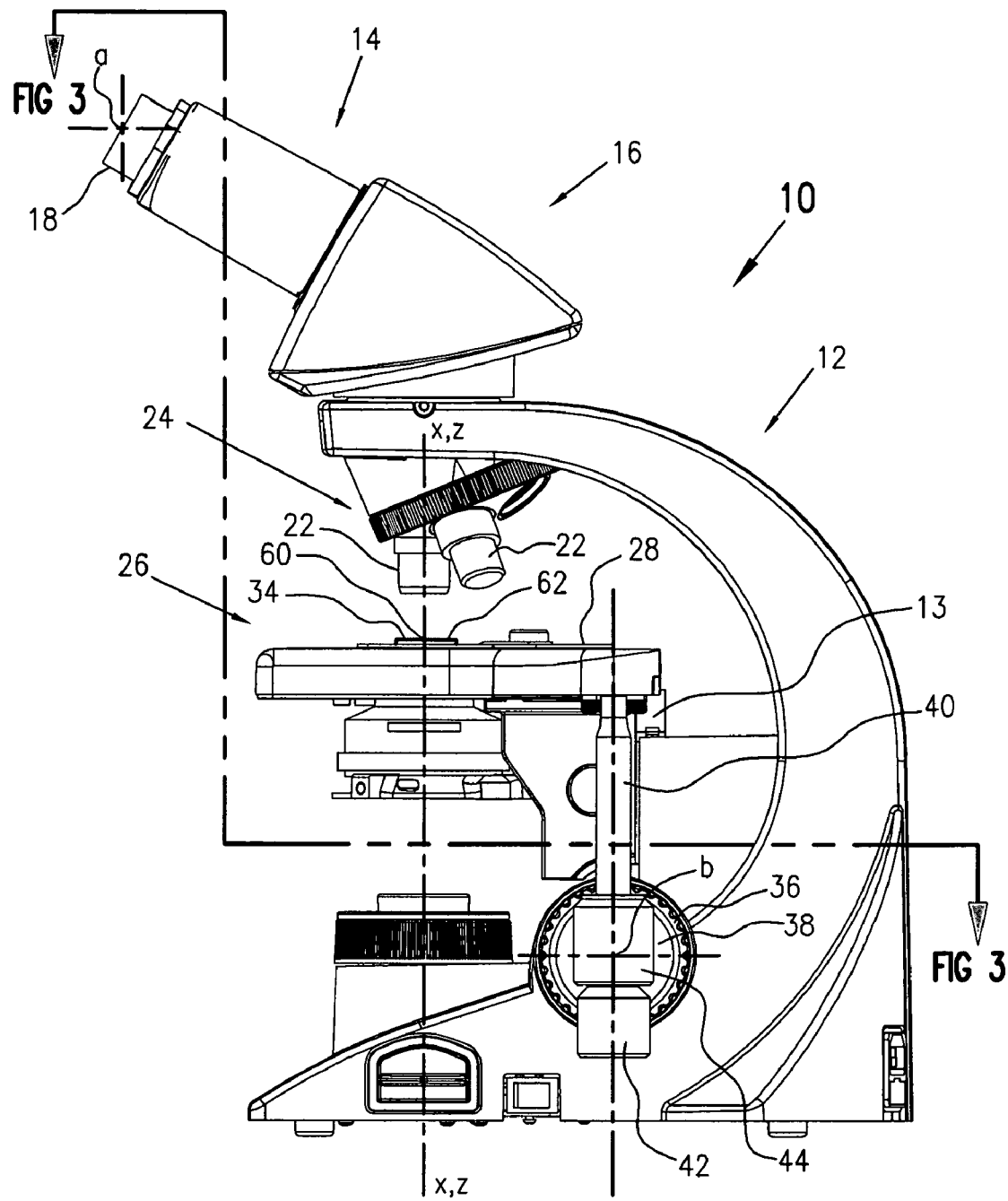
FIG. 2 is a side elevational view of a preferred embodiment of the present invention showing an x-y control knob mounted so as to intersect a rotational axis of a rotatable focusing knob of the microscope, when the optical path passes through a center of an object holding area of the object holder showing a cross-section line for FIG. 3A except with an ocular viewing body alternative embodiment.
Figure 6:
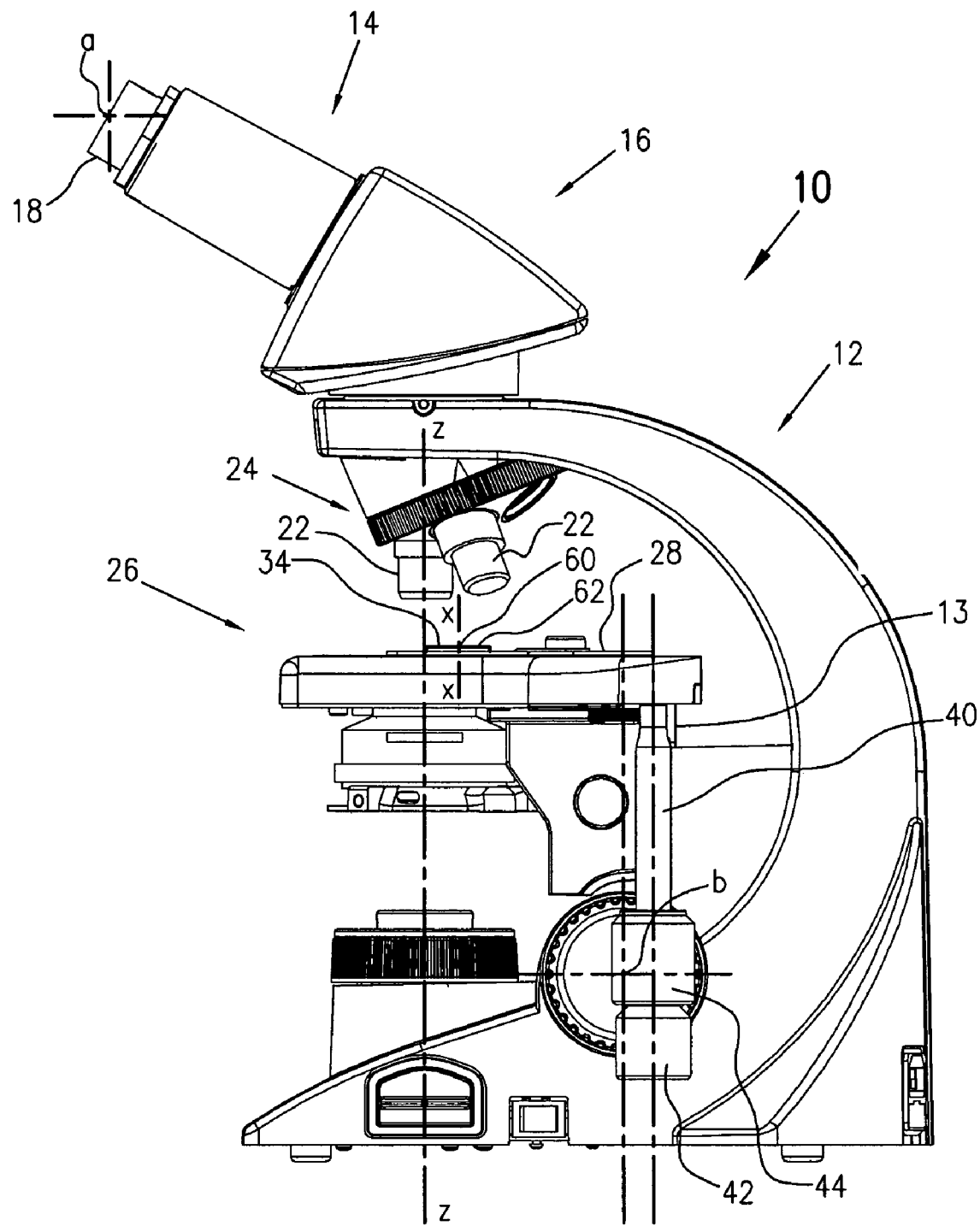
FIG. 6 is a side elevational view of a preferred embodiment of the present invention showing an x-y control knob mounted so as to intersect a rotational axis of a rotatable focusing knob of the microscope, when the optical path passes through a forward portion of an object holding area of the object holder.
Figure 7:
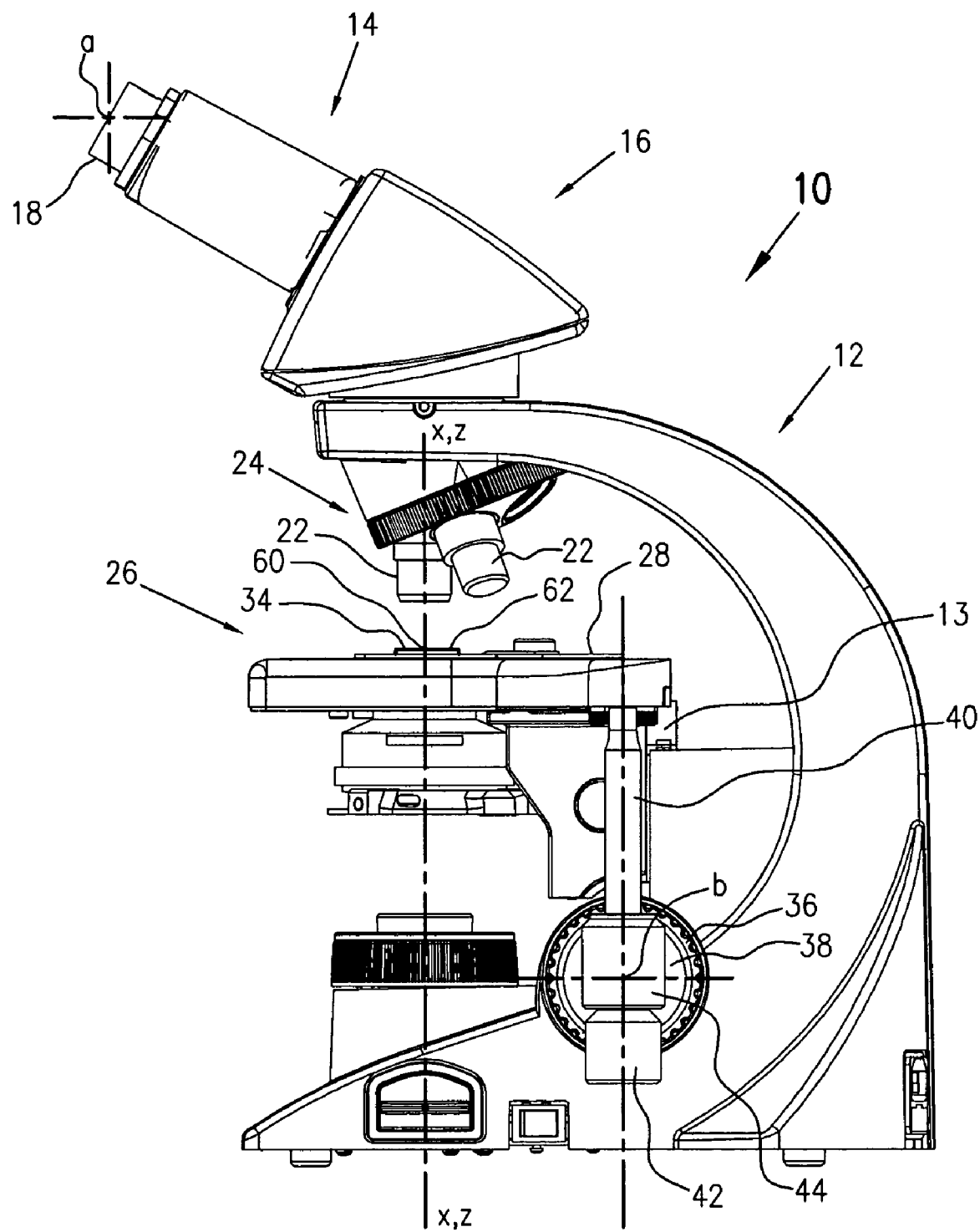
FIG. 7 is a side elevational view of a preferred embodiment of the present invention showing an x-y control knob mounted so as to intersect a rotational axis of a rotatable focusing knob of the microscope, when the optical path passes through a center portion of an object holding area of the object holder.
Figure 8:
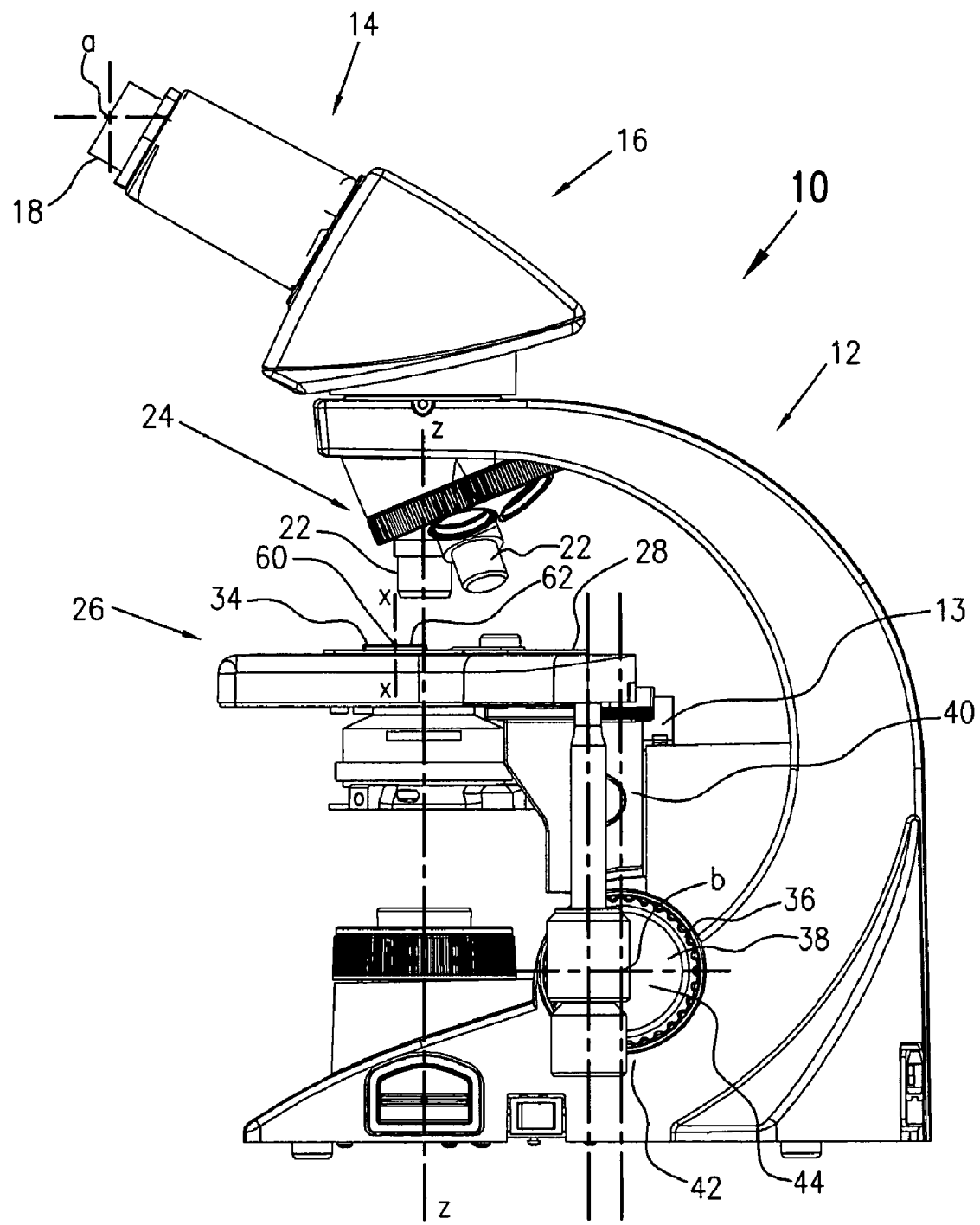
FIG. 8 is a side elevational view of a preferred embodiment of the present invention showing an x-y control knob mounted so as to intersect a rotational axis of a rotatable focusing knob of the microscope, when the optical path passes through a rear portion of an object holding area of the object holder.

In accordance with the invention, for efficient operation, controls 42 and 44 intersect rotational axis "b" and are proximate and nearly level with a focusing knob 36 (z control). As can be best seen in FIGS. 2, 6 and 7, rotation of knob 44 moves knobs 42 and 44 in the y direction. As seen in FIG. 2, when the knobs are centered on rotational axis "b", the "z" axis passes through the center 60 of specimen holder 62 of object holder 28. As seen in FIG. 6, rotation of knob 44 in a direction "e" can move the stage assembly toward the frame 12 of the microscope but not so far that the x-y control (knobs 42 and 44) no longer intersect rotational axis "b" and as seen in FIG. 7, rotation of knob 44 in a direction "f" can move the stage assembly away from the frame 12 of the microscope but again not so far that the x-y control (knobs 42 and 44) no longer intersect rotational axis "b".

Figure 3A:
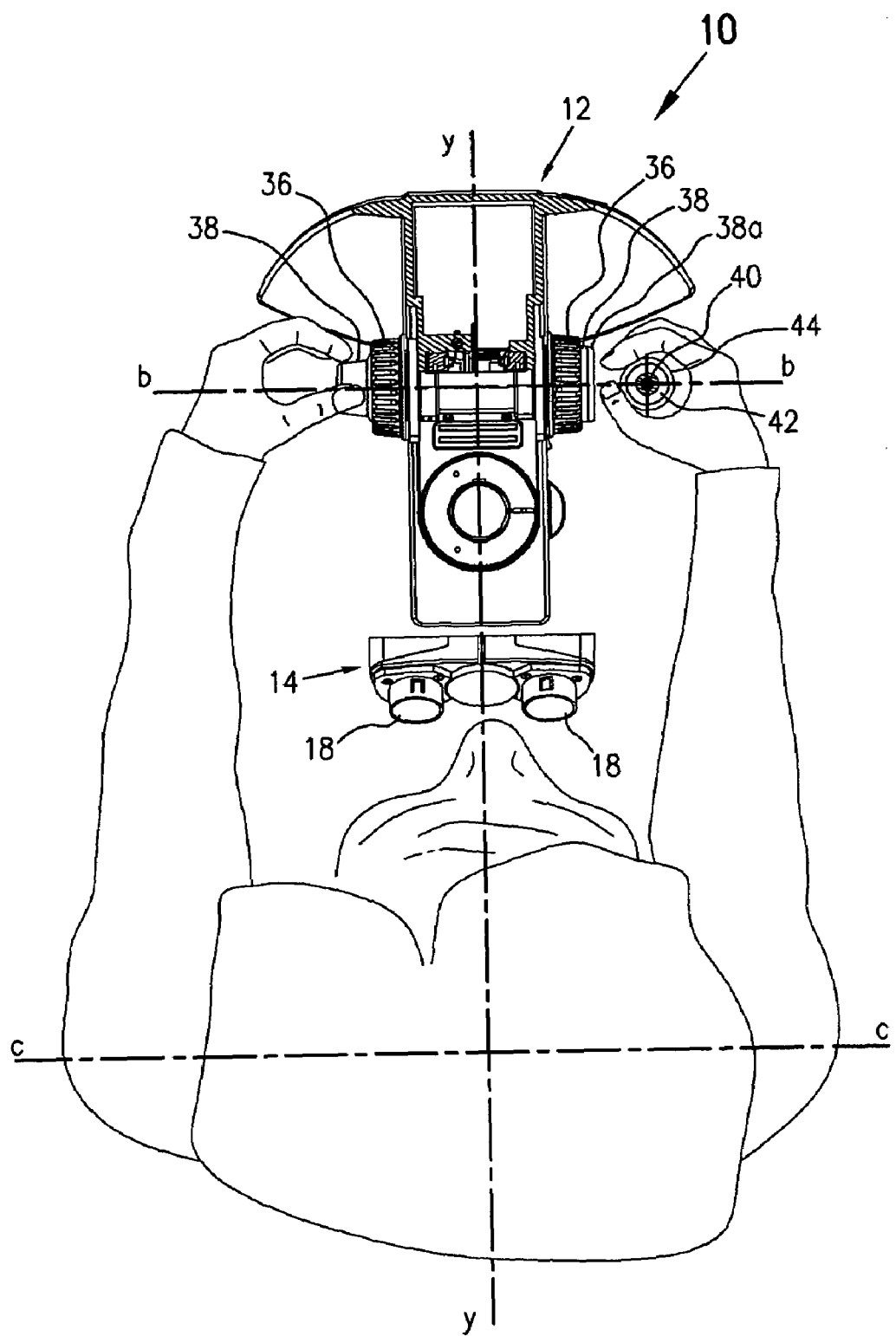
FIG. 3A is a top cross sectional view of the microscope taken on line 3—3 of FIG. 2 with a super imposed microscopist showing shoulder alignment and work surface edge in parallel alignment with the x-y axis, showing the right hand on an x-y control knob.

For efficient ergonomic operation, axis "x" may be aligned parallel with the front edge of a work surface, such as a desk, table or bench, upon which the microscope rests and the structure of the microscope is designed so as permit most efficient ergonomic operation when a line "c" through the shoulders of an operator are aligned parallel to axis "x" as best seen in FIG. 3A, thus avoiding postural problems due to twisting of the neck or spine during operation. In such a position, as best seen in FIGS. 3B and 3C, the relative arrangement of controls 42 and 44 (x-y control) with knobs 36 and 38 (z controls) permits single hand operation of both the x-y control and the proximate z controls, e.g. proximate fine adjustment knob 38 with minimal hand movement.

Figure 3B:
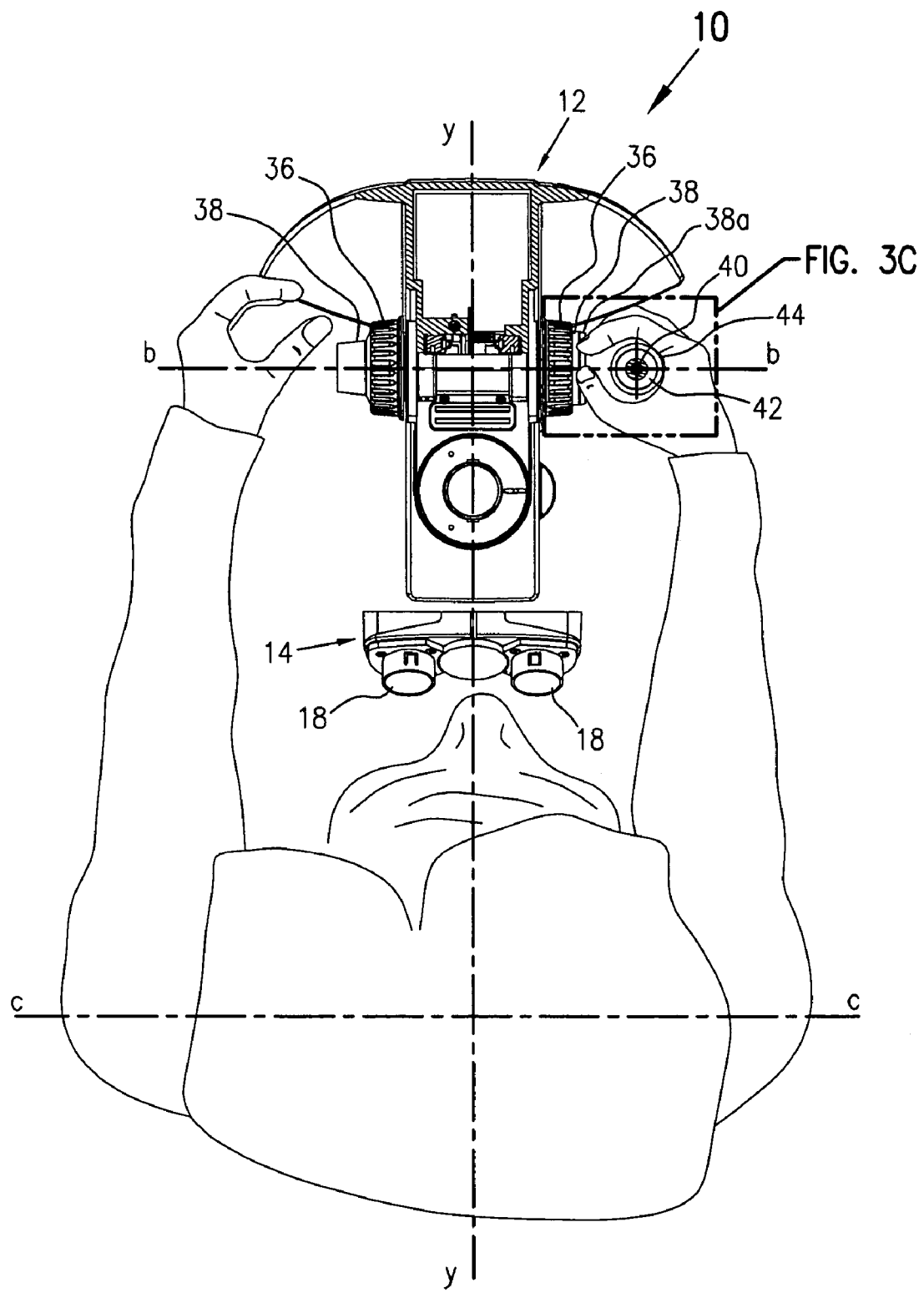
FIG. 3B is a view similar to FIG. 3A showing the right hand simultaneously on the x-y control knob and the right fine adjustment knob.
Figure 3C:
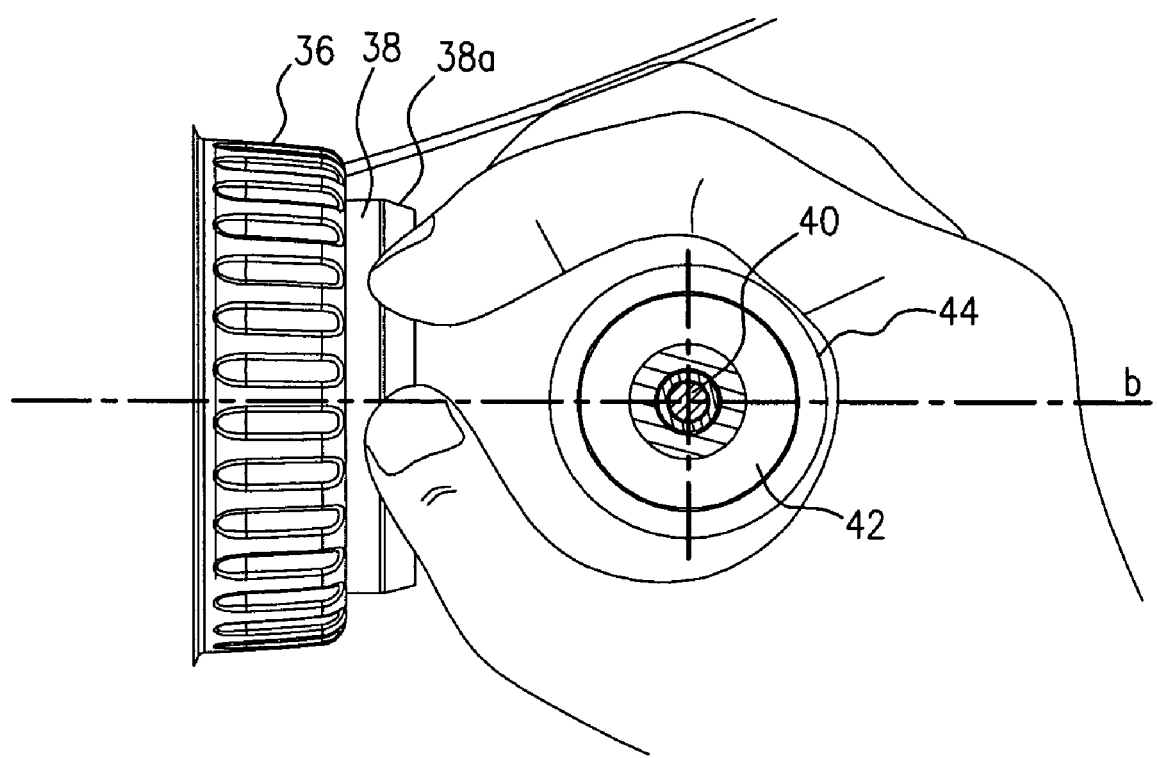
FIG. 3C is a magnified view of area "FIG. 3C" of FIG. 3B.

As best seen in FIGS. 3A, 3B and 3C, right fine adjustment knob 38 may be shortened relative to left fine adjustment knob 38 to permit better spacing between x-y controls, 42 and 44, and z controls 36 and 38. This shortening further permits operation of both controls 36 and 38 without significant hand adjustment, e.g. without forearm movement. When shortened, control 38 preferably has a conical surface 38a and optionally knurls, for increased ease of grip. It is to be understood that right and left hand controls, as shown in the drawings, can optionally be switched. Alternatively, due to essentially equal distance of the x-y control and z controls from an operator, the arrangement permits comfortable ergonomic dual hand operation of the x-y control and one of the z controls while permitting the shoulders of an operating microscopist to remain comfortably aligned parallel to the x direction.

Figure 4:
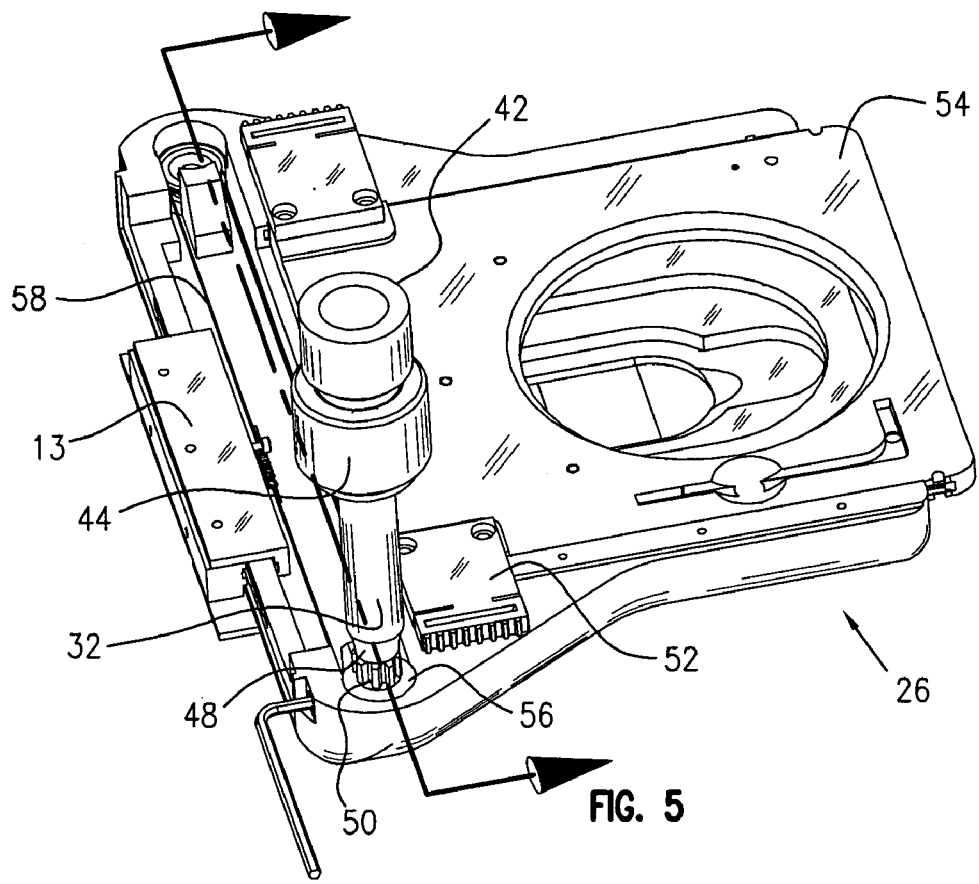
FIG. 4 is a bottom perspective view of a preferred embodiment of a stage assembly of a preferred embodiment of a microscope of the present invention.
Figure 5:
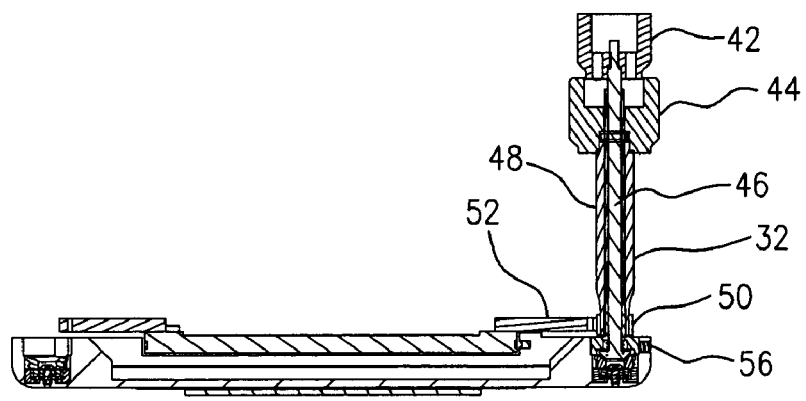
FIG. 5 is a cross sectional view of a preferred embodiment of a stage assembly in accordance with the present invention taken on line 5—5 of FIG. 4.

FIG. 4 is a perspective view illustrating the underside of the stage assembly 26 showing drive mechanism 32 and controls 42 and 44. As seen in FIGS. 4 and 5, control knob 44 is connected with control shaft 48 to a pinion 50 engaged with a rack 52 such that rotation of knob 44 rotates pinion 50 within rack 52 secured to a plate 54 forming a part of mounting bracket 13 thus moving stage assembly 26 relative to frame 12 in the y direction which in turn moves object holder 28 in the y direction. Knob 42 is connected by shaft 46 to pulley engaging cable loop 58 attached to the object holder 28 thus causing movement of object holder 28 in the x direction upon rotation of knob 42.

Thus, it is seen that the ergonomic objects of the present invention are efficiently obtained, although modifications and changes to the invention should be readily apparent to those having ordinary skill in the art, which modifications are intended to be within the spirit and scope of the invention as claimed.

What is claimed is:

1. A microscope comprising at least one ocular lens, at least one objective lenses and a microscope stage assembly which in turn has a stage planar surface, said stage assembly comprising:

means for attachment to a frame of the microscope so that the planar surface is essentially perpendicular to an optical path through a center of the objective lens; and an object holder for holding an object for examination by the microscope;

means for moving the object holder relative to the optical path so that a held specimen moves in a z direction parallel or coincident with the optical path said means comprising at least one rotatable focusing knob attached to a pinion to move a rack that moves the stage in the z direction; and means for moving the object holder in an x or y direction perpendicular to the z direction so that a held specimen moves through the optical path parallel to the planar surface, said means for moving the object holder comprising an x-y control having coaxial x and y control knobs, said x-y control being mounted so that the rotational axis of the x and y control knobs intersect a rotational axis of the rotatable focusing knob of the microscope, when the optical path passes through a center of a specimen holding area of the object holder.

2. The microscope of claim 1 wherein the means for attachment comprises a mounting bracket connected between the frame and the stage with attachment screws.

3. The microscope of claim 2 wherein the means for moving the object holder comprises a means for moving the entire stage.

4. The microscope of claim 3 wherein the means for moving the object holder further comprises a means for moving the object holder relative to the planar surface of the stage.

5. The microscope of claim 4 wherein the means for moving the object holder relative to the planar surface of the stage comprises a belt loop attached to the object holder that passes around pulleys rotatably mounted to the stage wherein said belt attachment to the object holder is located between said pulleys.

6. The microscope of claim 5 wherein a control knob coaxial with the first control knob is attached to one of said pulleys so that rotation of the second control knob rotates the pulley to move the belt and attached object holder relative to the planar surface of the stage.

7. The microscope of claim 6 wherein the first control knob rotates the pinion so as to move the stage in a direction perpendicular to the rotational axis of the focusing knob.

8. The microscope of claim 7 wherein the second control knob rotates the pulley so as to move the object holder in a direction parallel to the rotational axis of focusing knob.

9. The microscope of claim 1 wherein the means for moving the object holder comprises a pinion rotatably attached to the stage that engages with a rack rigidly attached to the frame so that rotation of the pinion moves the stage relative to the frame.

10. The microscope of claim 9 wherein the rack is rigidly attached to the frame by means of the mounting bracket.

11. The microscope of claim 9 wherein the control knob is attached to the pinion so that rotation of the control knob rotates the pinion to move the stage.

12. The microscope of claim 1 wherein the means for moving the object holder comprises a means for moving the object holder relative to the planar surface of the stage.

13. The microscope of claim 12 wherein the means for moving the object holder comprises a belt loop attached to the object holder that passes around pulleys rotatably mounted to the stage wherein said cable attachment to the object holder is located between said pulleys.

14. The microscope of claim 13 wherein the control knob is attached to one of said pulleys so that rotation of the control knob rotates the pulley to move the belt and attached object holder relative to the planar surface of the stage.

15. The microscope of claim 1 wherein the microscope has stereo oculars and the rotational axis of the focusing knob is parallel to a line through the center of the oculars.

\* \* \* \* \*